June 17, 1924.
J. E. LEONARD
1,498,177
LENS MOUNT FOR STEREOSCOPIC EFFECTS
Filed Aug. 22, 1921
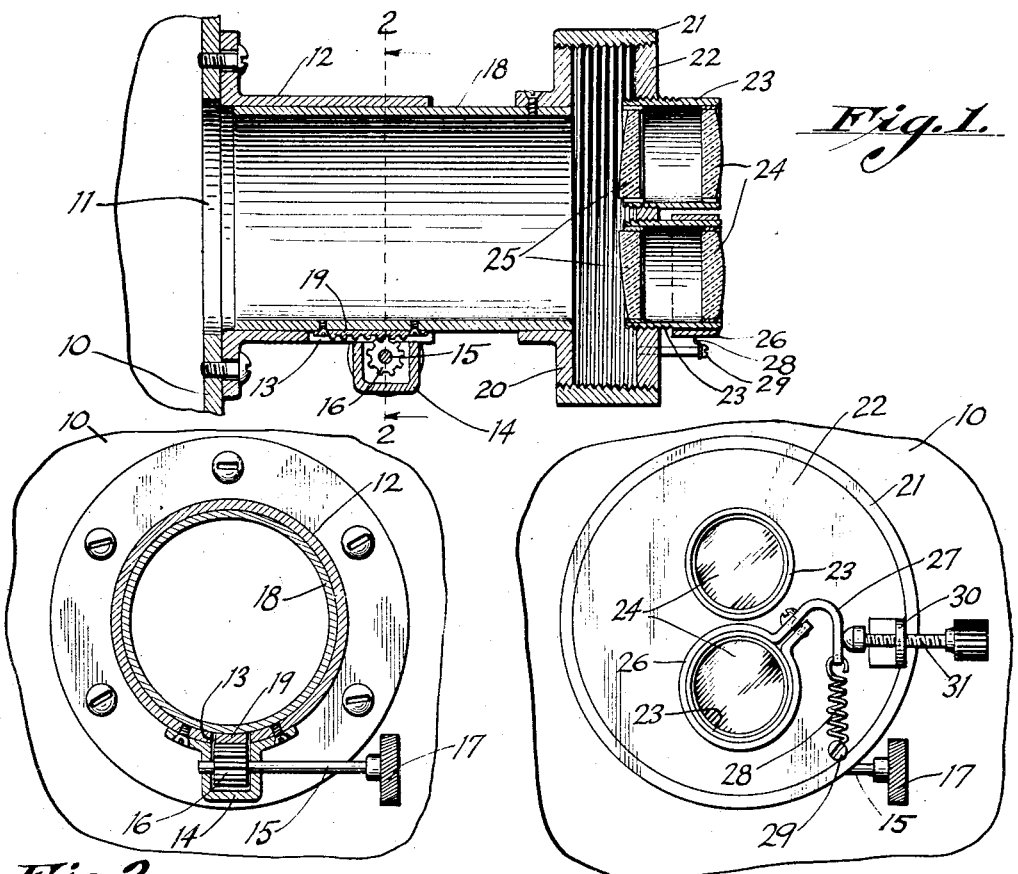
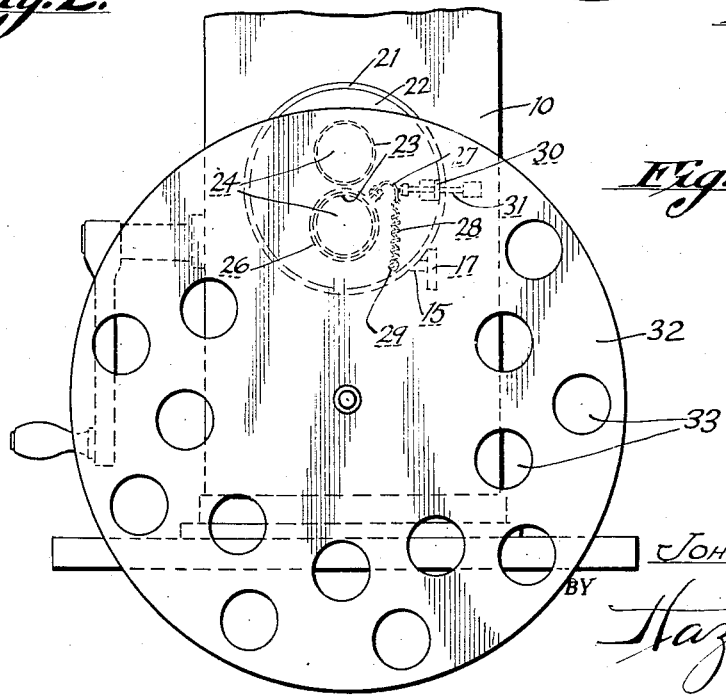
INVENTOR.
JOHN E. LEONARD.
BY
Hazard & Miller
ATTORNEYS.

Patented June 17, 1924.

1,498,177

UNITED STATES PATENT OFFICE.

JOHN E. LEONARD, OF HOLLYWOOD, CALIFORNIA, ASSIGNOR TO EDWARD H. MARTIN, OF LOS ANGELES, CALIFORNIA.

LENS MOUNT FOR STEREOSCOPIC EFFECTS.

Application filed August 22, 1921. Serial No. 494,345.

*To all whom it may concern:*

Be it known that I, JOHN E. LEONARD, a citizen of the United States, residing at Hollywood, in the county of Los Angeles and State of California, have invented new and useful Improvements in a Lens Mount for Stereoscopic Effects, of which the following is a specification.

My invention relates generally to stereoscopic picture projecting apparatus, and more particularly to a lens mounting for such apparatus, the principal objects of my invention being to provide a relatively simple and practical mounting for the twin lenses of stereoscopic picture projecting machines, and which mounting is capable of ready adjustment so as to accurately position the lenses relative to the film carrying the pictures that are being projected and with respect to the source of light utilized for projecting the pictures onto the screen.

The invention forming the subject matter of my present application is the same as a portion of the subject matter disclosed in my application filed July 13th, 1920, Serial No. 396,005.

My invention consists in certain novel features of construction and arrangement of parts hereinafter more fully described and claimed, and illustrated in the accompanying drawings, in which—

Figure 1 is a vertical section taken lengthwise through the center of a lens mount of my improved construction.

Fig. 2 is a cross section taken on the line 2—2 of Fig. 1.

Fig. 3 is a front elevational view of my improved lens mount.

Fig. 4 is a front elevational view of the shutter utilized in connection with the projecting lenses that are positioned in my improved mount.

Referring by numerals to the accompanying drawings, 10 designates the front wall of the projecting apparatus, said wall being provided with an opening 11 through which the light rays are projected, and secured to said front wall around said opening is a horizontally disposed forwardly projecting cylinder 12, in the lower portion of which is formed a longitudinally disposed slot 13. Secured to the under side of said cylinder and lying across the slot 13 therein is a housing 14 in which is journaled a horizontally disposed shaft 15. Secured on said shaft within the housing 14 is a pinion 16, and secured to the outer end of said shaft 15 is a disc 17 having a milled edge.

Arranged to slide lengthwise through cylinder 12 is a cylinder 18, on the under side of which is arranged a rack plate 19, the teeth of which are engaged by the teeth of pinion 16. Secured in any suitable manner to the outer end of cylinder 18 is an annular flange 20, the marginal edge of which is threaded, and removably seated thereupon is the internally threaded inner edge of a ring 21. Screw seated on the outer edge of ring 21 is a plate 22, and screw seated in threaded apertures that are formed in the said plate on opposite sides of the center thereof are lens barrels 23, each of which is provided in its outer end with a suitable projecting lens 24, preferably of the plano-convex type, and said barrel carrying at its inner end a prismatic lens 25.

Under normal conditions or when properly adjusted for projecting the light rays onto a screen these lens barrels are disposed one directly above the other, and clamped on the outer portion of one of said lens barrels, preferably the lower one, is a ring 26 having an outwardly projecting depending arm 27, and secured to the lower end of this arm is the upper end of a retractile spring 28, the lower end of which is secured to a pin 29 that is seated in plate 22. Fixed to and projecting outwardly from plate 22 is a bracket 30 in which is seated a short adjusting screw 31, the inner end of which bears against the depending portion of arm 27.

In the adjustment of my improved lens mount, cylinder 18 is moved outwardly or inwardly with respect to the film and the source of light utilized for projecting the pictures through the lenses 24 and 25, by proper manipulation of shaft 15, and as said shaft is rotated the teeth of pinion 16 engage the teeth of rack 19. Ring 21 may be rotated on flange 20 so as to bring the lens barrels 23 into exact vertical alinement, and the lenses of the barrel that is provided with ring 26 and arm 27 may be moved into proper alinement with the lenses of the other barrel by manipulation of adjusting screw 31 which bears against the depending portion of arm 27 to move the corresponding lens barrel in one direction, the retractile spring 28 tending to move said barrel in the reverse direction.

The shutter associated with my improved lens mount consists of a disc 32 that is positioned in front of the lens mount, and which may be rotated in any suitable manner, and said disc being provided with two rows of apertures 33, said rows being concentric with each other and concentric with the axis of rotation. The openings are spaced apart and staggered with relation to each other so that as the shutter is rotated, first one and then the other of the lenses will be unmasked.

Thus it will be seen that I have provided a relatively simple and practical lens mount for stereoscopic picture projecting machines, and which mount has a wide range of adjustment, and the structure thereof being such that it may be easily and cheaply produced.

It will be readily understood that minor changes in the size, form and construction of the various parts of my improved stereoscopic picture projecting apparatus may be made and substituted for those herein shown and described without departing from the spirit of my invention, the scope of which is set forth in the appended claims.

What is claimed is:

1. A lens construction including separate lenses arranged alongside one another, said lenses being independently rotatably adjustable, and spring-returned means comprising an adjusting screw engaging an arm secured relatively to one of said lenses for independently rotatably adjusting the same.

2. In a lens mount for stereoscopic picture projecting machines, a rotatably mounted member, a pair of independently adjustable lens-carrying barrels mounted in said member, and means mounted on said member for shifting the position of and comprising an adjusting screw engaging an arm one of said barrels so as to accurately adjust the position thereof with respect to the other barrel.

In testimony whereof I have signed my name to this specification.

JOHN E. LEONARD.